United States Patent
Foll et al.

[11] 3,793,707
[45] Feb. 26, 1974

[54] AUTOMATIC TURNING MACHINE

[75] Inventors: Gerhard Foll, Esslingen-Sulzgries; Heinz Dieter Baumer, Esslingen, both of Germany

[73] Assignee: Index-Werke KG Hahn & Tessky, Esslingen, Germany

[22] Filed: Dec. 30, 1971

[21] Appl. No.: 214,228

[30] Foreign Application Priority Data
Jan. 18, 1971 Germany.................. P 21 02 150.1

[52] U.S. Cl...................... 29/563, 29/38 C, 29/33 J, 29/564, 408/71
[51] Int. Cl............................................. B23q 39/04
[58] Field of Search......29/38 A, 38 B, 38 C, 563, 29/564, 27 R, 27 A, 27 C, 33 J, 36, 37 R, 37 A; 408/71

[56] References Cited
UNITED STATES PATENTS
| | | | |
|---|---|---|---|
| 2,087,109 | 7/1937 | Lee | 29/36 |
| 3,689,965 | 9/1972 | Bertoglio | 408/71 |
| 3,683,724 | 8/1972 | Crane | 29/38 B |
| 2,080,157 | 5/1937 | Yager et al. | 29/38 A |
| 3,200,472 | 8/1965 | Kohring et al. | 29/38 B |

FOREIGN PATENTS OR APPLICATIONS
1,259,674  1/1968  Germany........................... 29/37 A Primary Examiner—Francis S. Husar
Attorney, Agent, or Firm—Michael S. Striker

[57] ABSTRACT

An automatic turning machine which employs two discrete turning units and a transfer mechanism serving to deliver semifinished workpieces from the first unit to the second unit. The first unit employs a rotary work spindle which cooperates with several cross slides and, if necessary, with a turret or tool spindle for tools whereby the tools which are held by the cross slides and/or turret and tool slide treat the workpiece while the latter rotates with the work spindle. The second unit employs an indexible carrier with several sets of equidistant jaws which transport workpieces, received from the work spindle by way of the transfer mechanism, past several working stations at each of which a workpiece held by the respective jaws can be treated by one or more rotary tools which are mounted in tool spindles forming part of assemblies mounted for movement radially, in parallelism with or at another angle relative to the axis of the carrier.

15 Claims, 5 Drawing Figures

AUTOMATIC TURNING MACHINE

BACKGROUND OF THE INVENTION

The present invention relates to turning machines in general, and more particularly to improvements in automatic turning machines.

Certain types of presently known turning machines employ a rotary work spindle and one or more slides for tools which are fed against a workpiece while the latter is held by and rotates with the spindle. Such turning machines are capable of treating workpieces with a high degree of precision, especially as concerns the treatment of cylindrical surfaces. If a thus treated workpiece thereupon requires additional treatment, for example, the machining of its internal or external surfaces at the front end, the turning machine employs tool spindles and tool turrets; the tools carried by such spindles or turrets are brought into contact with a workpiece in the work spindle one after the other. Slotting, back-drilling and similar operations are carried out by resorting to auxiliary equipment which can be used in combination with the work spindle. The formation of radial or diametral slots or the like is performed while the workpiece is at a standstill. The just mentioned auxiliary equipment may comprise gripper means serving to engage a workpiece which has been separated from the bar and to introduce the freshly separated workpiece into a suitable chuck which is thereupon transferred to one or more treating stations. The output of such turning machines is relatively low.

It is also known to provide a turning machine with a carrier in the form of a turntable or turret whose periphery carries a plurality of equidistant work engaging means in the form of pairwise arranged jaws or claws which can releasably hold workpieces during transport toward and during treatment at a plurality of working stations. The just described types of turning machines employ rotary tools which can be fed into engagement with workpieces at the respective working stations, whereby a workpiece which dwells at a particular station can be simultaneously treated by two or more rotary tools. An advantage of such turning machines is that their output is much higher than the output of machines employing a rotary work spindle. However, the quality of work is less satisfactory, mainly because a thus produced article is likely to run out of true. The high output is attributable to the fact that the machine can treat a large number of workpieces at the same time, i.e., during each dwell between successive indexing movements of the turntable or turret, and also to the possibility of simultaneously treating any given workpiece by two or more rotary tools.

SUMMARY OF THE INVENTION

An object of the invention is to provide a novel and improved turning machine whose versatility far exceeds the versatility of presently known machines, which can be operated in a fully automatic way, which can finish at least some portions of workpieces with a very high degree of accuracy, and which can be used for the treatment of a wide variety of metallic or other workpieces.

Another object of the invention is to provide a turning machine which exhibits all advantages of the aforediscussed conventional machines but avoids their drawbacks.

A further object of the invention is to provide a turning machine which can finish workpieces with a high degree of precision and can turn out large numbers of workpieces per unit of time, which can be rapidly and conveniently converted for the treatment of different types and/or sizes of articles, and which can be used as a superior substitute for several conventional turning machines.

An additional object of the invention is to provide the improved turning machine with novel and improved transfer means for transporting semifinished workpieces between different types of work retaining means.

The improved turning machine comprises a first turning unit having a rotary work spindle and at least one tool supporting slide which cooperates with the work spindle so that a workpiece which is held and rotated by the spindle can be treated by a tool of the slide with a high degree of accuracy, a second turning unit having a carrier in the form of an indexible turret or turntable for a plurality of equidistant pairs of jaws or analogous work engaging means, means for indexing the carrier so as to move workpieces held by the work engaging means between a plurality of successive stations, and at least one tool supporting assembly provided at at least one of the stations and cooperating with the carrier so that a tool held by the assembly can treat a workpiece which is held by the respective work engaging means at the corresponding station, and transfer means which is or can be rendered operative to transport workpieces between the work spindle and a selected station. In accordance with a presently preferred embodiment, the transfer means is designed to transport workpieces from the work spindle to the work engaging means at the selected station so that a workpiece whose treatment in the first unit has been completed can be subjected to one or more additional treatments during transport by the carrier.

The turning machine is preferably further provided with control means which synchronizes the operation of the first unit with the operation of the second unit. Also, the carrier is preferably indexible about an axis which can be horizontal and is parallel with the axis of the work spindle.

The novel features which are considered as characteristic of the invention are set forth in particular in the appended claims. The improved turning machine itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
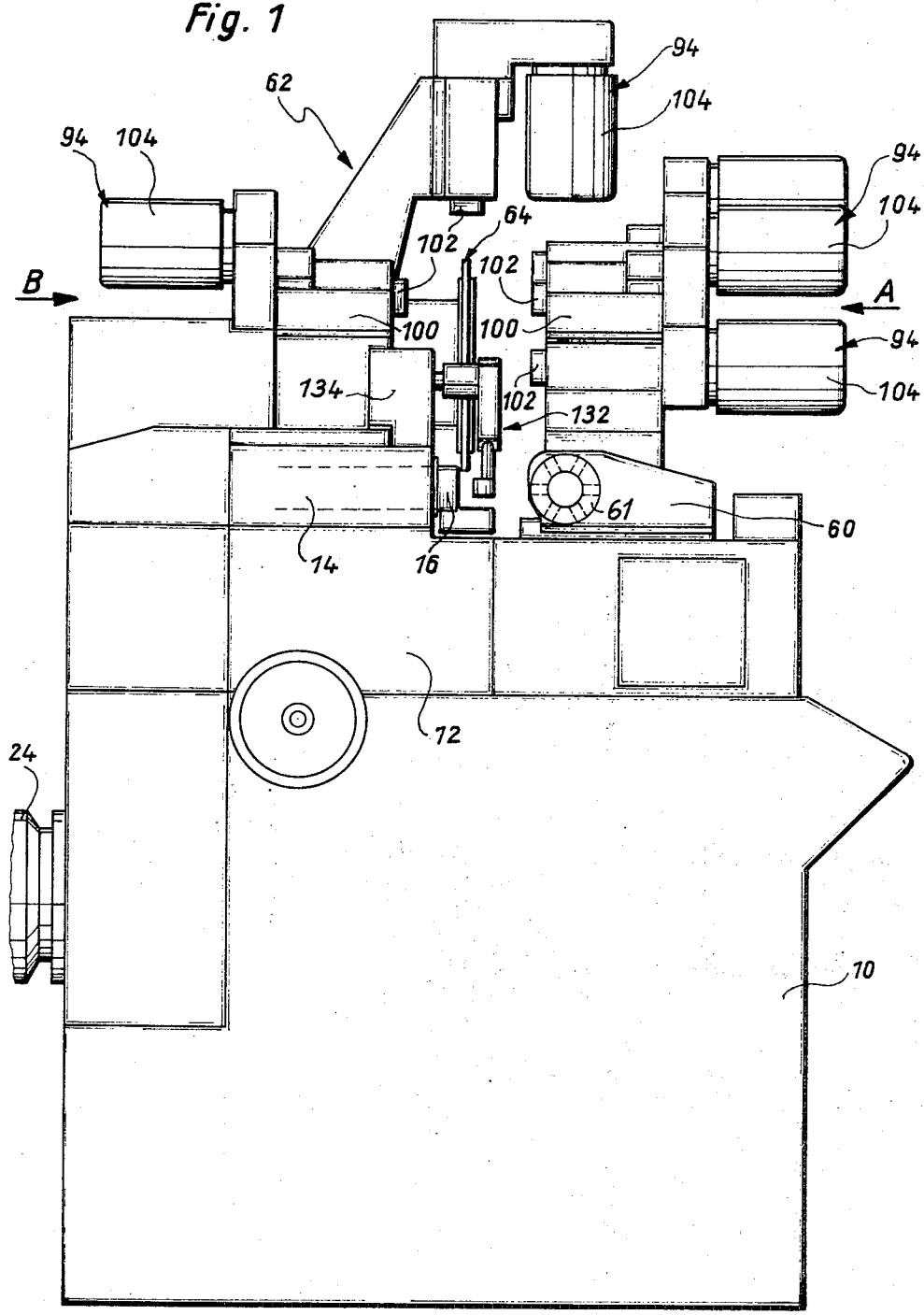
FIG. 1 is a side elevational view of a turning machine which embodies the invention.
Figure 2:
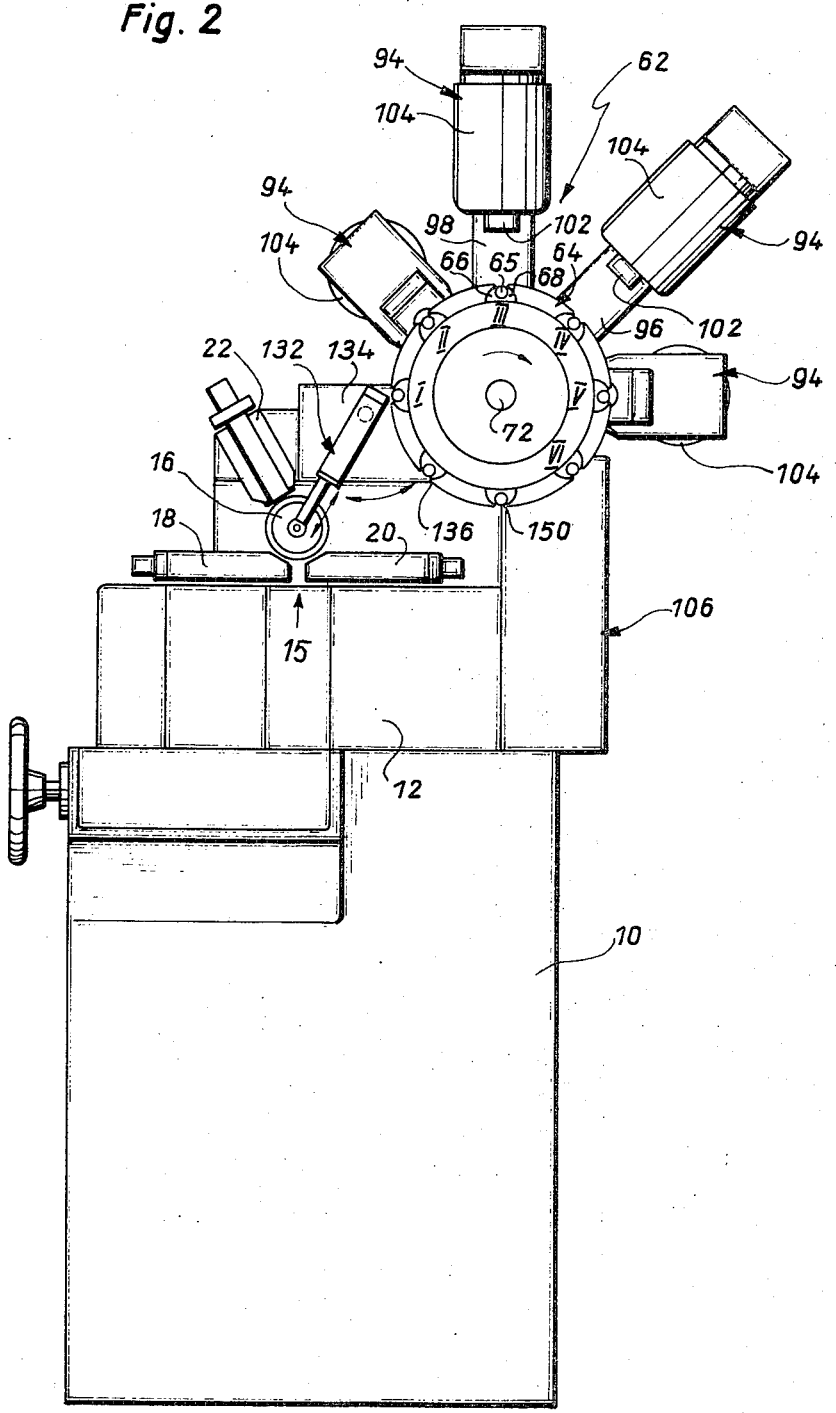
FIG. 2 is a front elevational view as seen in the direction of arrow A shown in FIG. 1, with certain parts omitted.
Figure 3:
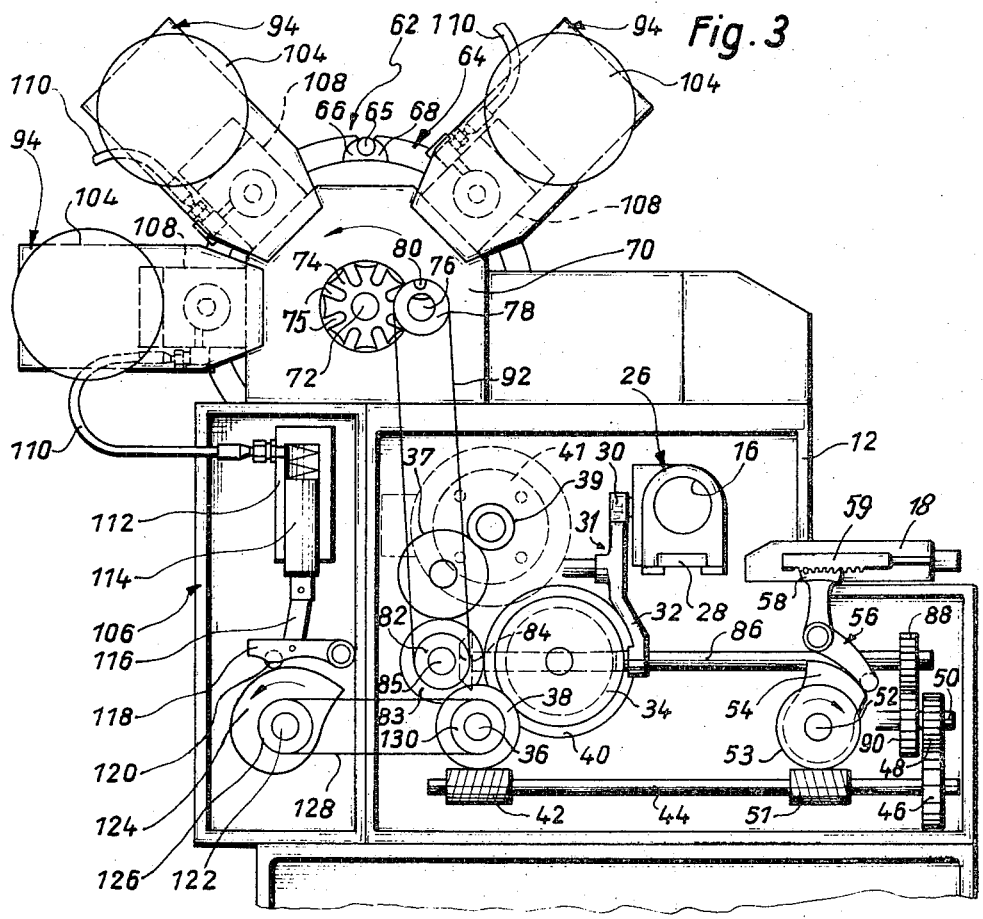
FIG. 3 is an enlarged fragmentary view as seen in the direction of arrow B shown in FIG. 1, with the cover for the control mechanism removed.

Referring first to FIGS. 1 to 3, there is shown an automatic turning machine comprising a frame 10 which is provided with an upwardly extending portion 12 serving as a base for a spindle box 14. The latter supports a rotary work spindle 16 which is rotatable about a horizontal axis. The work spindle 16 is assumed to be hollow so that it can accommodate an axially movable bar (not shown) the front end portion of which extends forwardly beyond the work spindle and can be treated by any one of several tools mounted on three cross slides 18, 20, 22 shown in FIG. 2. The cross slides 18, 20 are mounted on the base 12 substantially diametrically opposite each other (in nine- and three-o'clock positions) and can be fed radially toward the axis of the work spindle 16. The third cross slide 22 is mounted at or close to the eleven-o'clock position, as viewed in FIG. 2, and can also move its tool or tools radially toward the axis of the work spindle 16 whereby the tools which are carried by the cross slide 22 and/or the cross slides 18, 20 remove material from the workpiece while the spindle 16 rotates. Such turning operation renders it possible to machine selected surfaces of the workpiece with a high degree of precision. One of the tools carried by one of the slides 18, 20, 22 is a cutting off or parting tool which can separate a finished workpiece 65 from the remaining portion of the bar in the work spindle 16 so that the bar can be moved lengthwise to thus place its front end portion into the range of tools on the cross slides. The tools are mounted in suitable holders of the cross slides 18, 20, 22 in a well known manner, not shown. The drive means for the work spindle 16 includes an electric motor 24 a portion of which is shown in the lower left-hand portion of FIG. 1 and a suitable transmission which is mounted in the frame 10. The feeding and clamping mechanism for the bar is shown in FIG. 3, as at 26. This mechanism is mounted in the base 12 and is movable along a guide rail 28 which is parallel to the axis of the work spindle 16. The means for moving the feeding and clamping mechanism 26 with reference to the guide rail 28 comprises a two-armed lever 31 having a first or upper arm 30 coupled to the mechanism 26 and a second or lower arm 32 provided with a follower extending into the circumferential groove of a cylinder cam 34. The cam 34 can be rotated in response to engagement of a clutch 83 having an output member provided with a gear which meshes with a gear 40 of the cam 34. The clutch 83 is mounted on an auxiliary control shaft 85 which is driven by a motor 41 by way of a gear train 37, 39. The auxiliary control shaft 85 further drives a shaft 86 by way of bevel gears 84. The shaft 86 drives a further shaft 44 by way of exchangeable gears 88, 90, 48, 46. The gears 90 and 48 are mounted on an intermediate shaft 50 which is parallel with the shafts 86, 44 and normal to the auxiliary control shaft 85. The gears 46, 48, 90, 88 determine the duration of treatment of workpieces. The shaft 44 drives two control shafts 36, 52. The shaft 36 can be rotated by a gear 38 which meshes with a worm 42 on the shaft 44. The other shaft 52 can be rotated by a gear 53 which meshes with a second worm 51 on the shaft 44. The shaft 52 is a main control shaft, and its function is to control the movements of cross slides 18, 20 and 22. To this end, the main control shaft 52 comprises three cams 54, one for each of the cross slides 18, 20, 22, each of which cooperates with a roller follower on one of three discrete levers 56. Each lever 56 is a two-armed lever one arm of which is provided with the just mentioned follower for the associated cam 54 and the other arm of which is provided with a gear segment 58 meshing with a toothed rack 59 on the corresponding cross slide 18, 20 or 22 (see the right-hand portion of FIG. 3).

As shown in FIG. 1, the work spindle 16 is further associated with a tool turret 61 which has a set of equidistant radially extending tool holders and is movable axially of the work spindle 16 so that a selected tool thereon can treat the front face of a workpiece in the clamping and feeding mechanism 26. The housing 60 for the turret 61 is reciprocable along ways provided therefor on the base 12. The mechanism which can index the turret 61 and can move the housing 60 axially of the work spindle 61 is known and therefore not shown in the drawing. If desired or necessary, one of the cross slides 18, 20, 22 and/or the turret 61 can be replaced with a rotary tool spindle, not shown.

The heretofore described parts of the turning machine form a first turning unit 15 which can be used to treat the peripheral surface and the front end face of a workpiece while such workpiece is held by the mechanism 26 and rotates with the work spindle 16. In addition to the first turning unit 15, the turning machine further comprises a second turning unit which is designated by the reference character 62 and comprises an indexible carrier or turret 64 for a set of equidistant workpieces 65. To this end, the periphery of the carrier 64 is provided with pairs of equidistant work engaging claws or jaws 66, 68, for example, with a total of eight pairs of such jaws. A suitable actuating mechanism (not shown) of any known design is provided to move the jaws 66, 68 toward their operative or closed and inoperative or open positions at predetermined intervals so that finished articles 165 can be released at an evacuating station 150 (FIGS. 2 and 4), that fresh workpieces 65 can be introduced at a receiving station 136, and that the workpieces 65 can be treated by tools at one or more of the working stations I, II, III, IV, V, VI located between the stations 136 and 150. The just discussed actuating mechanism for the jaws 66, 68 may be of the mechanical, electromechanical or fluid-operated type.

FIGS. 2 and 3 show that the carrier 64 is indexible about a horizontal axis which is parallel with and located at a level above the axis of the work spindle 16. Furthermore, the axis of the carrier 64 is laterally offset with reference to the axis of the work spindle 16. FIG. 3 also shows that the carrier 64 is supported by a second portion 70 of the frame 10 which is mounted on top of the portion or base 12. The turning unit 62 comprises means for releasably locking the carrier 64 in selected angular positions, namely, in those positions in which successive pairs of jaws 66, 68 dwell at the stations 150, 136 and the working stations I to VI. The shaft of the carrier 64 is shown at 72, and this shaft carries a Geneva wheel 74 having eight radially inwardly extending slots 75 for the pin 80 of a driver wheel 78 which is rotatable by a shaft 76. The Geneva wheel 74 is mounted at the rear end of the shaft 72, namely at that end which is remote from the working stations I –

VI and the stations 136, 150. In response to each revolution of the driver wheel 78, the pin 80 causes the Geneva wheel 74 to turn through 45 degrees which is the angular distance between successive stations in the turning unit 62. The driver wheel 78 can be rotated by a gear, pulley or sprocket wheel 82 which is mounted in the interior of the base 12 and can receive torque from the clutch 83. The means for transmitting torque from the member 82 to the wheel 78 comprises an endless flexible belt (e.g., a toothed belt) or chain 92. The arrangement is such that the driver wheel 78 is caused to complete one full revolution in response to each engagement of the clutch 83.

The turning unit 62 further comprises a plurality of material removing assemblies 94 having carriages which are movable radially or in parallelism with the axis of the carrier 64 and can feed tools into workpieces 65 at the respective working stations. In the illustrated turning unit 62, there are provided two assemblies 94 which employ angular brackets 96, 98 for radially movable carriages and several assemblies 94 which are disposed in part at the opposite axial ends of the carrier 64 and include carriages movable in parallelism with the axis of the carrier to remove material at the respective ends of workpieces 65 held by the corresponding jaws 66, 68. As clearly shown in FIG. 1, the axial length of the carrier 64 is very small so that a relatively short workpiece 65 can be grasped by the jaws 66, 68 midway between its ends and is exposed at both ends for treatment by the adjoining assemblies 94. The rear assembly or assemblies 94 (including the left-hand assembly 94 of FIG. 1) are mounted on the base 12. The remaining assemblies 94 are mounted on a frame member 100 located in front of the carrier 64. Each of the assemblies 94 comprises a tool spindle 102 which is rotatable by a discrete electric motor 104 through the intermediary of a transmission not shown. It is clear that the tool spindles 102 of one or more assemblies 94 may make with the axis of the workpiece 65 at the respective one of the working stations I to VI an acute angle or an obtuse angle, depending on the nature of work which is to be performed by the tools in the tool spindles.

The control aggregate 106 which regulates the rapid advance and feed movements of tools which are mounted in the tool spindles 102 of the assemblies 94 is mounted on the frame 10 adjacent to the base 12. The assemblies 94 are preferably designed in such a way that the movements of respective tools radially or axially of the carrier 64 are effected by means of a pressurized fluid, e.g., oil. Therefore, each assembly 94 comprises a hydraulic cylinder 108 (see FIG. 3) which is connected with the aggregate 106 by a hose 110. The aggregate 106 comprises a control cylinder 112 for each assembly 94, and each cylinder 112 is connected with the respective hose 110. The pistons 114 of the control cylinders 112 are articulately coupled with levers 118 by way of links 116, and the levers 118 have roller followers 120 which track discrete cams 124 mounted on a camshaft 122. The camshaft 122 can be driven by a sprocket wheel 126 through the intermediary of a chain 128 which is further trained over a sprocket wheel 130 on the control shaft 36. It is clear that the chain drive 126, 128, 130 can be replaced by a belt-and-pulley drive or any other suitable means for transmitting torque from the control shaft 36 to the camshaft 122. The cams 124 are adjustable with reference to the camshaft 122 so that the respective pistons 114 can be displaced in a predetermined sequence and perform working and return strokes of predetermined length. This enables the operators to insure that the tools mounted in the tool spindles 102 of the assemblies 94 will treat the workpieces 65 at the respective stations of the turning unit 62 in a desired sequence. Depending on the nature of the workpieces 65 and on the intended final shape 165 of such workpieces, each thereof can be treated by one or more tools at the front side of the carrier 64 as well as by one or more tools at the rear side of the carrier. Furthermore, any given workpiece 65 can be treated simultaneously by two tools, i.e., by tools located at the opposite sides of the carrier 64.

Figure 4:
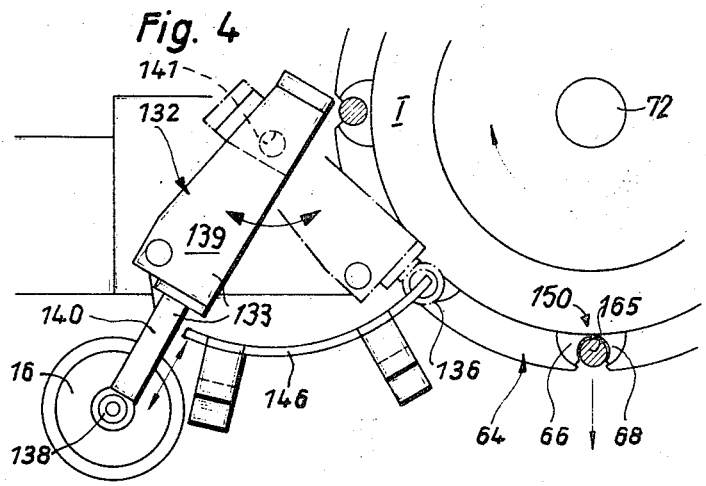
FIG. 4 is an enlarged view of the transfer device in the turning machine of FIG. 1, with the transfer device shown in two different positions.
Figure 5:
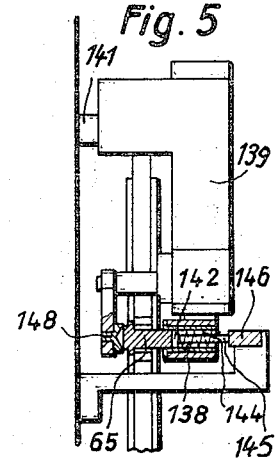
FIG. 5 is a side elevational view of the structure shown in FIG. 4, with certain parts of the transfer device illustrated in section.

In the illustrated embodiment of the turning machine, the two turning units 15 and 62 are operatively connected or coupled with each other by means of a transfer device 132 which is designed to transport workpieces 65 from the work spindle 16 into the spaces between the jaws 66, 68 dwelling at or moving toward the receiving station 136. The transfer device 132 is mounted on a projection 134 of the base 12 and can be actuated by a pressurized fluid, e.g. oil. This transfer device comprises a single arm 133 which is pivotable about a horizontal axis (see the pivot 141) extending in parallelism with the axes of the work spindle 16 and carrier 64. When a cutting off or parting tool (e.g., a tool in the cross slide 22) has separated a workpiece 65 from the bar which extends through the work spindle 16, the arm 133 of the transfer device 132 engages and moves such workpiece from the work spindle to the receiving station 136 for delivery into the space between the adjoining jaws 66, 68 which are then held in their open positions. As shown in FIGS. 4 and 5, the free or lower end of the arm 133 of the transfer device 132 is provided with a work engaging transfer element in the form of a sleeve 138 which can engage a workpiece 65 at the adjacent end of the work spindle 16. The sleeve 138 is mounted on a piston rod 140 which is connected with the piston of a cylinder 139 of the arm 133. The cylinder 139 for the piston which is connected with the piston rod 140 is preferably actuated by a pressurized hydraulic fluid. In one end position of the transfer device 132, the gripping sleeve 138 is located in front of and in axial alignment with the workpiece 65 in the work spindle 16. The internal diameter of the sleeve 138 equals or closely approximates the external diameter of the workpiece 65 in the spindle 16 so that the sleeve 138 can be pushed onto and thereupon retains such workpiece as soon as the latter is separated from the bar in the spindle 16. The arrangement is such that, in order to move the sleeve 138 into or from register with the work spindle 16, the cylinder 139 of the arm 133 cams the piston rod 140 to move radially of the pivot 141. The sleeve 138 accommodates a reciprocable pusher 142 which is biased to a front end position by a helical spring 144. The shank 145 of the pusher 142 extends forwardly beyond the sleeve 138 and constitutes a follower which tracks the arcuate face of a stationary cam 146 when the transfer device 132 turns about the axis of the pivot 141 so as to move the workpiece 65 in the sleeve 138 toward the receiving station 136. The shank or follower 145 of the pusher 142 registers with the cam 146 when the arm 133 is shortened, i.e., when the piston rod 140 is retracted into the cylinder 139. When the sleeve 138 approaches or reaches the receiving station 136, the cam 146 causes the pusher 140 to partially expel the workpiece 65 from the sleeve 138 whereby one axial end of the workpiece abuts against a stop 148 on the transfer device 132. When it assumes such axial position, the workpiece 65 enters into the space between the adjoining jaws 66, 68 at the receiving station 136 by moving radially of the carrier 64. The jaws 66, 68 are thereupon caused to close and to safely grip the workpiece 65. The sleeve 138 is then slipped off the thus gripped workpiece 65 between the jaws 66, 68 and the transfer device 132 is ready to return to the solid-line position of FIG. 4. The carrier 64 is thereupon indexed to advance the workpiece 65 from the receiving station 136 into register with the tool or tools working at the first working station I, thereupon at the station II, and so on toward the evacuating station 150.

The controls for the tools which treat workpieces in the spindle 16 are associated with the indexing mechanism for the carrier 64 in such a way that the latter can be indexed through 45 degrees only upon completed transport of a workpiece 65 by the transfer device 132. In other words, the carrier 64 can be indexed only upon completion of treatment of a workpiece in the spindle 16. This is achieved due to the fact that the indexing mechanism for the carrier 64 receives motion from the clutch 83 for the work spindle 16. As mentioned before, the indexing mechanism includes the Geneva wheel 74 on the shaft 72 of the carrier 64 and the driver wheel 78 mounted on the shaft 76 and having the pin 80 which can turn the Geneva wheel 74 and hence the carrier 64 during a certain stage of a full revolution of the driver wheel 78. The latter is driven by the clutch 83. The clutch 83 controls the mechanism 26 for feeding the bar in the work spindle 16 and for clamping the bar upon completion of such lengthwise movement which is necessary to expose the front end of the bar for conversion into a workpiece 65. The clutch 83 is engaged upon completion of a workpiece 65 in the spindle 16 and upon completed transfer of such workpiece to the receiving station 136. The clutch 83 then causes the bar in the work spindle 16 to advance lengthwise and the Geneva wheel 74 is caused to turn the shaft 72 of the carrier 64 through 45 degrees. Thus, the length of intervals between successive indexing movements of the carrier 64 depends on the length of intervals which are required to form a workpiece 65 and to transfer such workpiece to the receiving station 136. The length of such intervals is normally less than that required for the feeding of rotary tools in the tool spindles 102 of the assemblies 94 by the cams 124 on the camshaft 122. The mounting of cams 124 on a single camshaft 122 which is remote from the assemblies 94 reduces the space requirements of the turning machine. The cylinders 112 and 108 constitute so-called hydraulic linkages which establish operative connections between the camshaft 122 of the control aggregate 106 and the respective assemblies 94. An advantage of such hydraulic linkages is that the assemblies 94 can be distributed in the turning unit 62 in any desired way, i.e., any selected assembly 94 can be shifted from the front side to the rear side of the carrier 64 or vice versa, and any desired assembly 94 can be moved to any one of the working stations I to VI between the stations 136, 150. A finished article 165 which reaches the evacuating station 150 is removed or ejected in response to opening of the respective jaws 66, 68. The released finished article 165 can be caused to descend by gravity into a suitable receptacle, not shown, or onto a suitable take-off conveyor.

Once the carrier 64 is loaded with workpieces 65, a finished article 165 is discharged at the evacuating station 150 in response to each indexing of the carrier. The precision work is done in the first turning unit 15 which includes the work spindle 16, and the operations which can be carried out with a lesser degree of precision are performed in the second turning unit 62. It is clear, however, that the transfer device 132 can be designed to transport workpieces from the station 136 to the work spindle 16. The working station I (FIG. 4) immediately downstream of the station 136 is then a receiving station where the blanks requiring treatment by the tools of assemblies 94 are supplied to the carrier 64 and the station 150 can accommodate one or more assemblies 94. Still further, the persons in charge might wish to operate the turning units 15 and 16 independently of each other; the transfer device 132 is then useful as a means for delivering workpieces to the work spindle 16 or for delivering workpieces from a magazine to the receiving station 136. Alternatively, the transfer device 132 can be used to remove workpieces 65 from the work spindle 166 for delivery to a magazine from which a second transfer device removes workpieces 65 for delivery to the carrier 64. Such mode of operation will be selected if the turning unit 62 is set up to process the workpieces 65 at a rate exceeding the rate of delivery of workpieces 65 from the work spindle 16. Thus, once the just mentioned magazine contains a certain supply of workpieces 65, the turning unit 62 can be operated at a high speed while the first unit 15 including the spindle 16 turns out workpieces at the normal rate whereby the rapid operation of unit 62 can last as long as the magazine contains one or more workpieces 65.

The improved turning machine can be used with particular advantage for the production of articles whose treatment must be carried out in a substantial number of stages and wherein certain operations must be performed with a much higher degree of precision than the remaining operation or operations. Thus, all precision treatments can be carried out while a workpiece rotates with the work spindle 16 of the first unit 15 and all other treatments can be carried out while the workpiece 65 is held by a pair of jaws 66, 68 on the carrier 64. In other words, the first unit 15 treats a single workpiece at a time but the second unit 62 is capable of treating several workpieces during each period of dwell of the carrier 64. It is clear that the treatment to which the workpieces are subjected by the tools of the assemblies 94 is also a precision treatment; however, at least some of these tools might not be required to remove material with the same degree of precision as the tools in the cross spindles 18, 20, 22 and/or the tools in the turret 61.

When the control means shown in FIG. 3 synchronizes the operation of the first unit 15 including the work spindle 16 with the operation of the second unit 62, the length of intervals during which the carrier 64 dwells between successive indexing movements is normally determined by the first unit 15, i.e., by the length of the interval which is required to convert a piece of bar into a workpiece 65. Such interval is normally longer than the interval required by any one of the assemblies 94 to complete the treatment of a workpiece 65 which is held by the jaws 66, 68 at the respective one of the working stations I to VI. The feature that the axis of the carrier 64 is parallel with the axis of the work spindle 16 allows for a simplification of the transfer device 132 because the latter is merely required to pivot about an axis (of the member 141) which is parallel with the axes of the parts 16, 64 and to move the sleeve 138 radially and axially, i.e., in parallelism with the axes of the parts 62, 16 and radially of the pivot 141. The receiving station of the second turning unit 62 is that (selected) station which is nearest to the work spindle 16. This insures that the sleeve 138 must cover a relatively short distance in order to transport a freshly formed workpiece 65 from the work spindle 16 to the receiving station 136.

It is also clear that the illustrated transfer device 132 constitutes but one of a large number of transfer means which can be utilized in the improved turning machine for the transport of workpieces between the turning units 15 and 62. The same holds true for the design of the carrier 64. It was found that the transfer device 132 exhibits a number of important advantages, particularly as concerns its compactness (space requirements), its initial and maintenance cost, and the accuracy of work transfer between the work spindle 16 and the receiving station 136. The single arm 133 of the transfer device 132 occupies little room so that, when it moves the sleeve 138 into register with the work spindle 16 of the first turning unit 15, the single arm 133 is not likely to interfere with movements of tools on the cross slide 18, 20 and/or 22. This is particularly important when the cross slides are fed one after the other and when one of these slides is caused to move relative to the work spindle 16 at the time when the sleeve 138 is about to engage with and remove a freshly formed workpiece 65. As best shown in FIG. 2, the cylinder 139 of the arm 133 can cause the piston rod 140 to move the sleeve 138 downwardly toward a position of registry with the work spindle 16 and thereupon upwardly to entrain the freshly separated workpiece 65 and to move the follower 145 into register with the cam 146 prior to pivotal movement of the arm 133 to the phantom-line end position of FIG. 4.

It is also within the purview of the present invention to construct the turning units 15 and 62 in the form of two discrete modules which can be used independently of each other or combined to form the improved turning machine. Thus, the module which constitutes the turning unit 15 can be used independently of the module which constitutes the turning unit 62, and vice versa. The control system (see FIG. 3) which can synchronize the operation of the turning unit 15 with that of the turning unit 62 is then also composed of two or more modules which can be rapidly assembled or dismantled, depending upon whether the two units are to be used together or independently of each other.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. In a turning machine, a combination comprising a first unit having a rotary work spindle and at least one tool supporting slide cooperating with said spindle so that a workpiece held and rotated by said spindle can be treated by a tool on said slide; a second unit having a carrier for a plurality of equidistant work engaging means, means for indexing said carrier so as to move workpieces held by said work engaging means between a plurality of stations, and at least one tool support assembly provided at least at one of said stations and cooperating with said carrier so that a tool held by such assembly can treat a workpiece held by said work engaging means at said one station; and transfer means operative to transport workpieces between said spindle and a selected one of said stations, said transfer means comprising an arm which is pivotable about an axis parallel to that of said spindle, a work engaging transfer element carried by said arm, and means for moving said transfer element in longitudinal direction of said arm and in the radial direction of said spindle to move said work engaging transfer element between two end positions, in one of which it registers with said spindle and in the other of which with said selected station.

2. A combination as defined in claim 1, further comprising control means for synchronizing the operation of said first unit with the operation of said second unit.

3. A combination as defined in claim 1, wherein said carrier is indexible about an axis which is parallel with the axis of said spindle.

4. A combination as defined in claim 1, wherein said selected station is nearer to said spindle than the other stations.

5. A combination as defined in claim 1, wherein said arm is arranged to transfer workpieces from said spindle to said selected station.

6. A combination as defined in claim 1, wherein said transfer element is arranged to receive a workpiece from said spindle and to transfer such workpiece to work engaging means at said selected station, said transfer means further comprising means for expelling a portion of the workpiece from said transfer element during movement of said arm from said one toward said other end position.

7. A combination as defined in claim 1, wherein said means for moving said transfer element in longitudinal direction of said arm comprises cylinder and piston means mounted on said arm and comprising a piston rod carrying on a free end thereof said transfer element.

8. A combination as defined in claim 6, wherein said transfer element is a sleeve.

9. A combination as defined in claim 8, wherein said expelling means comprises a pusher which is reciprocably received in said sleeve and comprises follower means extending from said sleeve, and stationary cam means adjacent to the path of movement of said sleeve while said arm moves between said end positions to thereby shift said pusher in said sleeve by way of said follower means.

10. A combination as defined in claim 1, wherein the workpiece in said spindle constitutes one end of a bar which is movable axially of said spindle, and further comprising control means for effecting a lengthwise movement of such bar with reference to said spindle simultaneously with actuation of said indexing means.

11. A combination as defined in claim 10, wherein said control means comprises clutch means and a mechanism for feeding the bar axially of said spindle and for clamping the bar during treatment by the tool carried by said slide.

12. A combination as defined in claim 1, wherein said second unit comprises a plurality of tool supporting assemblies each of which includes a rotary tool spindle.

13. A combination as defined in claim 1, wherein said first unit further comprises an indexible turret for tools and means for moving said turret with reference to said work spindle so that a workpiece rotating with said spindle can be treated by a tool of said turret.

14. A combination as defined in claim 1, wherein said second unit comprises a plurality of tool supporting assemblies including two assemblies located at a common station.

15. A combination as defined in claim 14, wherein said work engaging means are arranged to expose two axial ends of workpieces which are held thereby and the tools of said two assemblies are arranged to treat the opposite ends of workpieces at said common station.

* * * * *